Sept. 8, 1953 R. D. FAGEOL 2,651,316
SPEED RESPONSIVE GOVERNOR FOR INTERNAL-COMBUSTION ENGINES
Filed April 12, 1949 3 Sheets-Sheet 1
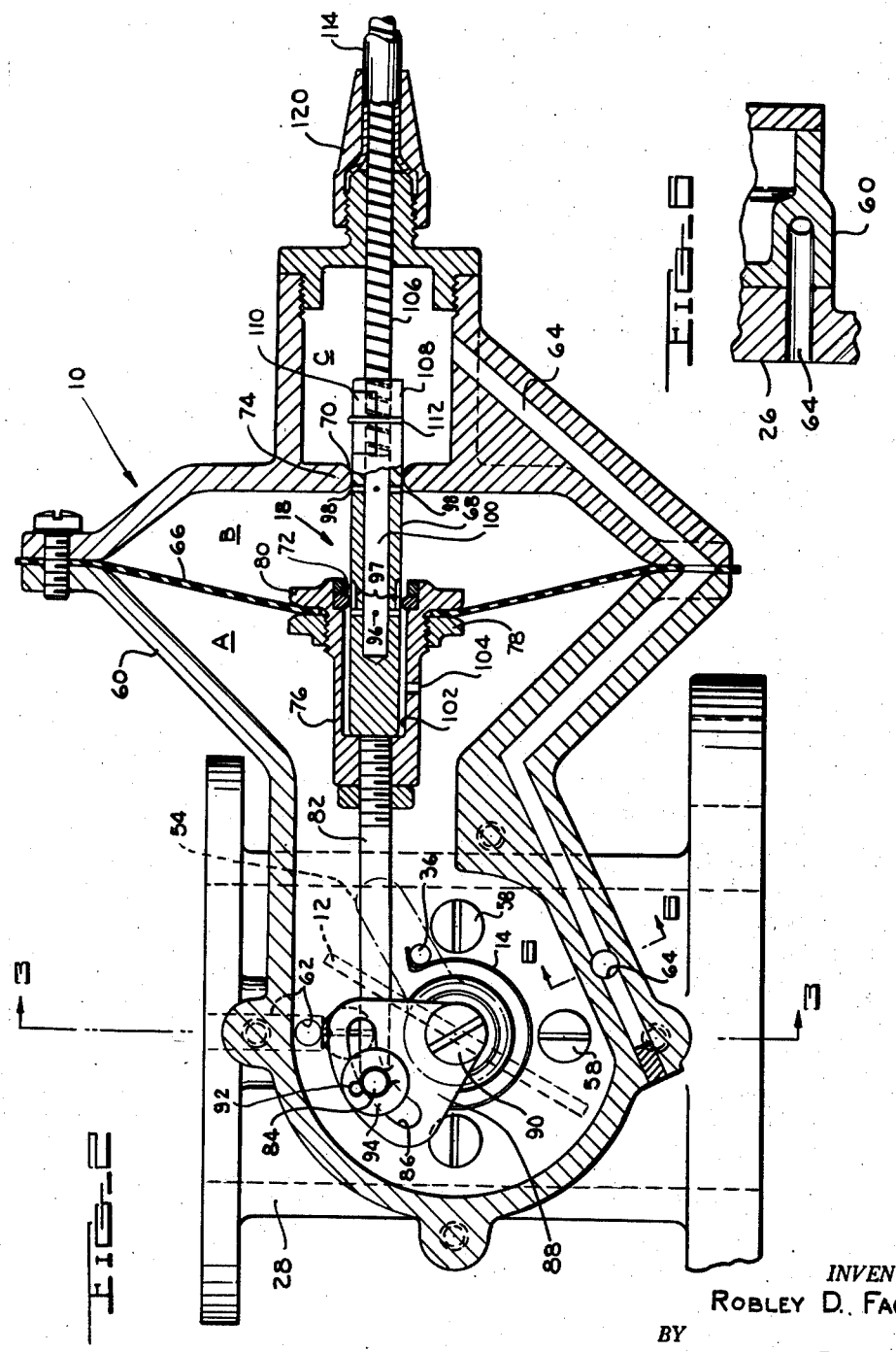
INVENTOR.
ROBLEY D. FAGEOL
BY
ATTORNEY

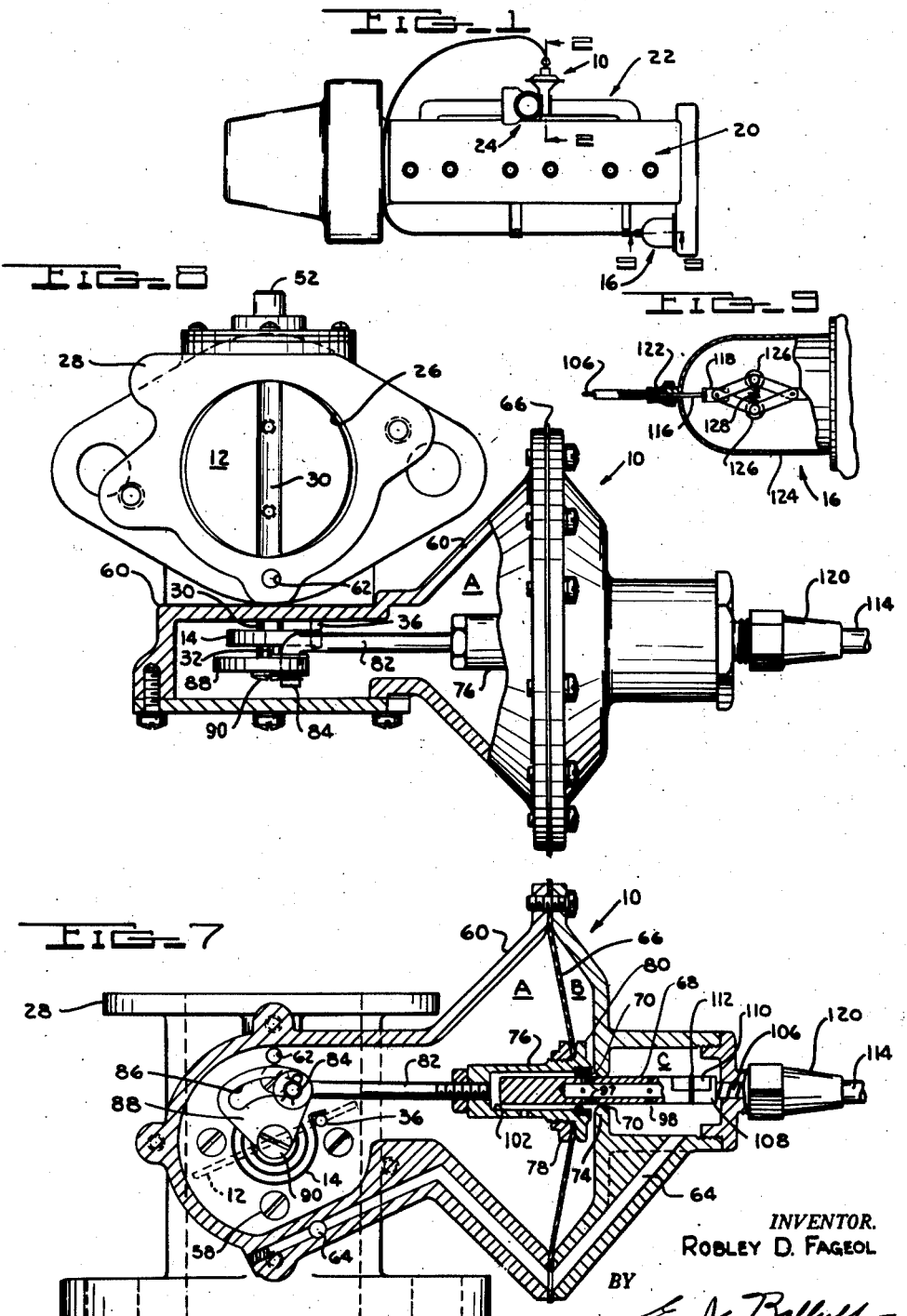

Sept. 8, 1953 R. D. FAGEOL 2,651,316
SPEED RESPONSIVE GOVERNOR FOR INTERNAL-COMBUSTION ENGINES
Filed April 12, 1949 3 Sheets-Sheet 3
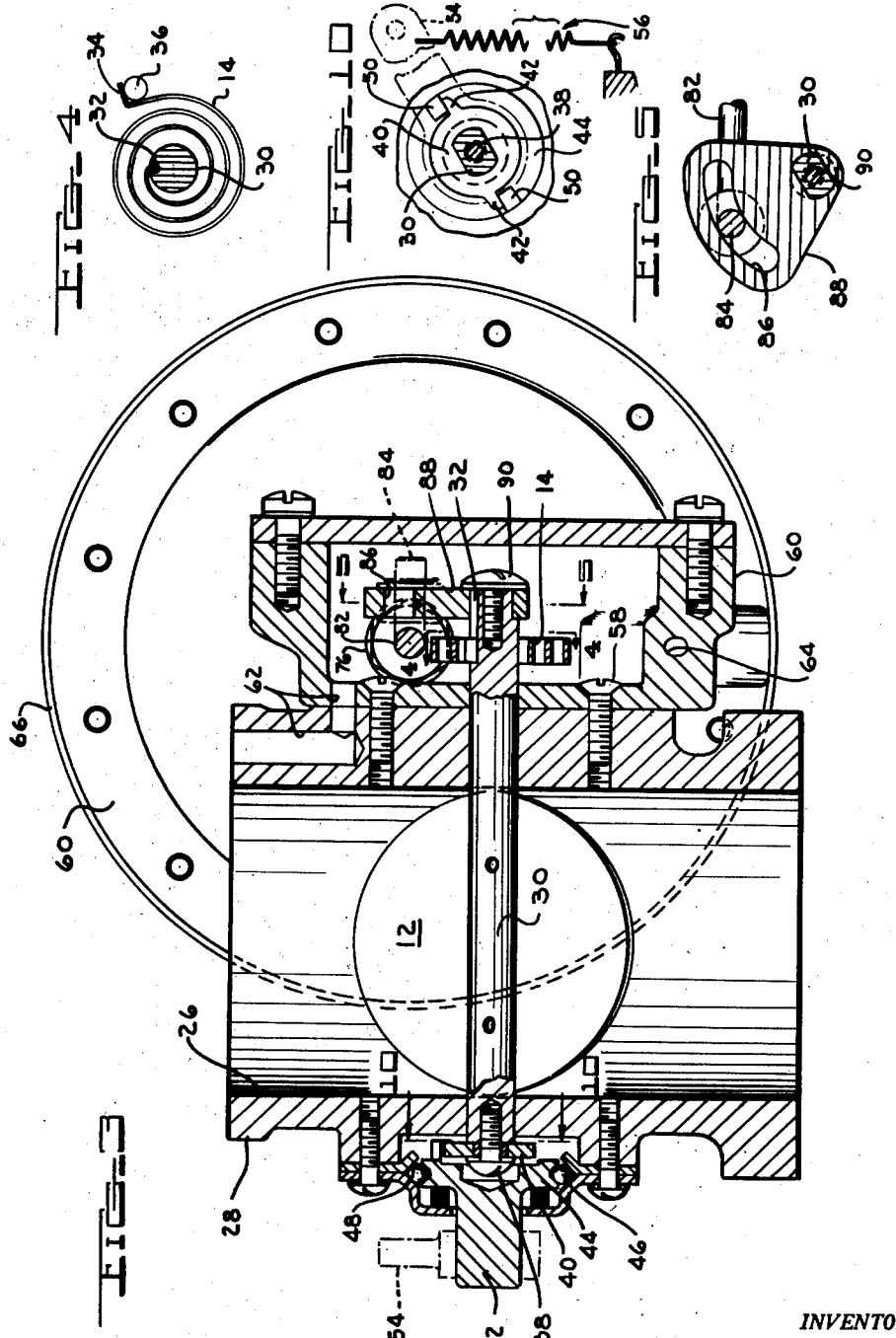
INVENTOR.
ROBLEY D. FAGEOL
BY
*E. J. Balluff*
ATTORNEY Patented Sept. 8, 1953

2,651,316

UNITED STATES PATENT OFFICE 2,651,316

SPEED RESPONSIVE GOVERNOR FOR INTERNAL-COMBUSTION ENGINES

Robley D. Fageol, Detroit, Mich., assignor to R. D. Fageol Company, Detroit, Mich., a corporation of Michigan Application April 12, 1949, Serial No. 86,999

10 Claims. (Cl. 137—57)

1

This invention relates to governing devices for engines and more particularly to devices for governing or limiting to a predetermined maximum the speed of vehicles driven by engines such as internal combustion engines.

A principal object of the present invention is to provide a governing device that is not sensitive to friction and peculiar torque reactions of the governing butterfly valve or to the means which bias the valve toward its open position.

Present governors operate under a balanced effort when in operation. In other words, the force that tends to close the governing valve is offset in balance with a spring or a series of springs in combination with cam mechanisms, linkages or levers. This results in a poor governing action when dirt or carbon accumulates on the moving parts. Because of their construction any change of friction in present day governors affects the proper operation of the governors. Furthermore, governors currently used today must be individually calibrated for different engines. This is necessary due to the fluid flow forces developing an uneven torque effort on the throttling butterfly valve. This results in the necessity of troublesome bell crank and rod assemblies between the governing unit and the carburetor throttle valve. All of this type of construction makes it possible for friction to interfere with the proper functioning of the governor mechanism.

According to the present invention, an engine actuated power unit, preferably a suction operated device, is connected to the butterfly valve and is operable upon energization for moving the valve toward its governing position. Such power unit is constructed and arranged so as to be capable of exerting a force tending to close the governing valve materially greater than the force exerted on the valve tending to open the same, so that the power unit is insensitive to normal friction and torque reactions affecting valve movement and also to the means biasing the governing valve toward its open position.

An engine speed responsive means is arranged to control the actuation of the power unit by the engine so as to energize the power unit when the engine attains a predetermined speed, whereupon the power unit will move the valve to its governing position.

Another object of the invention, therefore, is to provide a new and improved governing device which will operate more uniformly and dependably than devices of this sort heretofore known.

Other and further objects of the invention will

2 be apparent from the following description and claims and will be understood by reference to the accompanying drawings, of which there are three sheets, which by way of illustration show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a plan view of an internal combustion engine having a governing device embodying the invention installed thereon;

Fig. 2 is an enlarged sectional view of the suction operated device which forms the power unit for operating the governing valve;

Fig. 3 is a sectional view taken along the line 3—3 of Fig. 2;

Fig. 4 is a fragmentary sectional view taken along the line 4—4 of Fig. 3 and showing the coil spring which biases the butterfly valve toward its open position;

Fig. 5 is a sectional view taken along the line 5—5 of Fig. 3 and showing the connection between the power unit and the shaft of the throttle valve;

Fig. 6 is a fragmentary sectional view taken along the line 6—6 of Fig. 2 and showing part of the communication between the main air passage to the engine and the suction actuated device;

Fig. 7 is a view similar to Fig. 2 but showing the suction actuated device in its governed or operative position;

Fig. 8 is a plan view of the device as shown in Fig. 7;

Fig. 9 is a schematic illustration of a mechanical engine driven governor taken along the line 9—9 of Fig. 1; and Fig. 10 is a fragmentary view taken along the line 10—10 of Fig. 3.

As illustrated in the embodiment of the invention selected for purposes of illustration, a governing device comprising an engine actuated power unit or suction device indicated generally at 10 (Fig. 2) is connected to a butterfly or throttle valve 12. A coil spring 14 forms a means for biasing the valve 12 toward its open position. The suction device is constructed and arranged so as to be capable of exerting a force tending to close the valve 12 materially greater than the force exerted by the spring 14 on the valve tending to open the same, and the force exerted by the suction device may be several times greater than that exerted by the spring 14. An engine speed responsive means indicated generally at 16 (Fig. 1) controls the actuation of the suction device 10 by the engine so as to energize the suction device when the engine attains a predetermined speed. The suction device 10 includes means, such as the valve indicated generally at 18, which is operated in part by the engine speed responsive means 16 to control the admission of suction to the suction device 10 in order to effect the operation thereof.

An engine 20, such as an internal combustion engine, includes an induction system 22 having a fuel carburetor 24 associated therewith for supplying and regulating the supply of fuel and air to the engine. Passageway 26 formed in body 28 forms a part of the induction system and has the usual carburetor throttle valve 12 arranged therein. Valve 12 is secured on shaft 30 which is journaled in bearings formed in the body 28. One end of the shaft 30 is provided with a groove 32 and one end of coil spring 14 is anchored in such groove 32. The other end 34 of spring 14 is held by a stationary pin 36, and the coil spring is partially wound so as to bias the valve 12 to its open position. The other end of the shaft 30 has secured thereon by means of screw 38 a lever 40 provided with two radially extending arms 42.

A wheel 44 provided with a grooved periphery is rotatably supported by balls 46 which operate in race 48. The wheel 44 is provided with laterally extending lugs 50 which lie in the same path of rotation as the arms 42 so that when the wheel 44 rotates clockwise (Fig. 10) the lugs 50 will by engagement with the arms 42 turn the lever 40 and the shaft 30 and the throttle valve 12 with it. It should be noted that the end of the shaft 30 and the hole in the lever 40 through which the shaft projects have flat sides so that the shaft 30 will turn with the lever 40. The wheel 44 has a stub shaft 52 to which a lever 54 is secured, the lever 54 forming a means for turning the shaft and a part of the usual linkage between the throttle valve 12 and the foot pedal or accelerator lever which is usually provided for operating the throttle valve 12.

A spring indicated generally at 56 connected at one end to the lever 54 and at its other end to a stationary part of the engine biases the lever 54 in a position to close the throttle 12. The spring 56 exerts a greater force on the throttle shaft 30 than does the spring 14 so that if no force is applied to the lever 54 in a counterclockwise direction (Fig. 10) the spring 56 will position the throttle valve 12 in its closed position. This mechanism just described is commonly referred to as a one-way throttle mechanism because it acts to close the throttle mechanically. However, when the lever 54 is moved in a counterclockwise direction (Fig. 10), the force of the spring 56 holding the throttle closed is overcome and the spring 14 is then free to move the throttle toward its open position.

The suction actuated device 10 comprises a multipart casing or housing 60 which is attached to the body 28 by screws 58. The housing is provided with chambers A, B and C, the chamber A being in communication with atmosphere through passage 62 (Figs. 2 and 3). A passage 64 (Figs. 2 and 6) forms a communication between the chamber C and the passageway 26 through which fuel flows on its way to the engine, the passage 64 communicating with the passageway 26 on the downstream or engine side of the throttle 12. Thus the chamber C is at all times subjected to the suction existing in the induction system on the engine side of the throttle 12. A flexible diaphragm 66 separates the chamber A from the chamber B.

The chamber B is adapted to be alternately exposed to suction and to atmosphere by means of the valve 18 so as to effect the operation of the suction device 10. The valve 18 comprises a hollow tubular valve member 68 which is reciprocally supported in bearings 70 and 72. The bearing 70, formed by the edges of a hole in the partition 74 which separates the chambers B and C, constitutes a valve seat. The bearing 72 is secured in a hollow tubular member or bushing 76 which extends through a central opening in the diaphragm 66 and is secured thereto by nut 78 which cooperates with the head 80 of the bushing 76 to clamp the edge of the diaphragm 66 therebetween.

The bushing 76 is affixed to one end of a link 82, the other end 84 of which is bent laterally and extends through a slot 86 in a lever 88 affixed to one end of the shaft 30 by means of screw 90 so that the lever 88 will turn the shaft 30 and turn therewith. A cotter pin 92 and washer 94 secure the end 84 of the link 82 in the slot 86. The end 84 of the link 82 is slidable in the slot lengthwise of the slot relative to the lever 88 so that the lever 88 is free to move within limits relative to the end 84 of the link 82.

The suction actuated device as shown in Fig. 2 is in its deenergized position so that the coil spring 14 is free to turn the shaft 30 to open the throttle 12 to an extent until the right-hand end of the slot 86 engages the end 84 of the link 82, providing, of course, that the lever 54 is positioned so as to permit the spring 14 to open the throttle.

The hollow tubular valve member 68 is provided with a series of ports 96 and 98. The bearing 72 forms a valve closure member for the ports 96 and cooperates with the tubular valve member 68 to separate the chamber B from the chamber A except for such communication as may be permitted through ports 96, 98, the milled grooves 97 shown in Fig. 2, and the passage 100 provided by the inside of the tubular valve member 68. The left-hand end of the valve member 68 projects into the cavity or chamber 102 in the bushing 76 and this chamber 102 is in communication with the chamber A through port 104.

A cable 106 is connected to the end 108 of the valve member 68 within the chamber C by means of a clamping pad 110 and snap ring 112. The cable 106 extends through a tube 114 and at its other end 116 is connected to a part 118 of the centrifugal governor 16. One end of the tubing 114 is secured by means of nut 120 to a threaded part of the housing of the suction unit 10 and the other end of the tubing is secured by a nut 122 to a threaded part of the housing 124 of the governor mechanism 16.

The governor mechanism 16 is shown in its collapsed position and includes a plurality of weights 126 which are held in their retracted position by means of a spring 128. The weights 126 of the governor mechanism are rotated during engine operation, as is well known, and when the engine attains a predetermined speed the centrifugal force of the weights 126 will be sufficient to overcome the force of the spring 128 and fly outwardly, thereby drawing part 118 and the cable 106 to the right (Fig. 9). The cable 106 does not rotate and is connected to the governor mechanism 16 and the valve 68 so that the valve 68 will be positioned by the governor mechanism 16, the cable 106 for this purpose providing a positive two-way connection between the valve 68 and the governor mechanism 16.

As is common in governor mechanisms of the type shown at 16, the weights 126 will remain in their retracted position as shown until they reach the speed at which they are set to operate when the centrifugal force will be sufficient to overcome the spring 128 and cause the weights to fly out sharply. The weights will remain in their extended position until the speed of rotation of the governor falls below the speed at which the governor is set to collapse, and when the speed of rotation of the governor decelerates below such speed, the spring 128 will retract the weights 126 and thereby move the cable so as to position the valve 68 in the position as shown in Fig. 2. The position of the valve member 68 as determined by the governor 16 when the weights 126 are in their extended position is shown in Fig. 7.

With the parts arranged as shown in Fig. 2 it may be assumed that the engine is operating at some speed below the governing speed thereof. When the governing speed is reached the governor mechanism 16 will shift the valve 68 to the right to the position as shown in Fig. 7. This will through the ports 98 and 96 and the passage 100 port the chamber B to suction, whereupon the diaphragm 66 will move to the position as shown in Fig. 7. This will through the link 82 and the lever 88 move the throttle 12 toward its closed or to a governing position so as to cut down the flow of fuel into the engine through the passageway 26. It will be noted that there is no positive force transmitting connection between the valve 68 and the diaphragm 66. However, the diaphragm 66 will follow the movement of the valve 68 because the valve 68 will port the chamber B to suction, and since the chamber A is exposed to atmosphere the diaphragm 66 will move to effect a power stroke of the suction actuated device 10.

When the governor mechanism collapses, the valve member 68 will move to the left from the position in which it is shown in Fig. 7, which will effectively dissipate the suction in the chamber B by porting the chamber B to atmosphere through the milled grooves 97, the chamber 102, the port 104, the chamber A, and the passage 62 although the chamber B is still ported to suction through openings 97, 96, 100, 98 and 64. This action releases the vacuum in chamber B and the spring 14 is free to open the throttle valve 12. The action just described will reposition the diaphragm 66 in its left most position. It is therefore apparent that the diaphragm 66 and the connecting rod 82 must follow the movement of the valve member 68 even though there is no mechanical connection between such members.

It is also apparent that a relatively small amount of power is required to move the flexible cable 106 and the valve member 68. However, if there is friction or other torque interferences to the free movement of the connecting rod 82 or the shaft 30, the ports 96 will merely port a greater amount of vacuum to the chamber B and keep the valve member 72 close to the ports 96. Under all conditions below the selected governing speed, the valve member 68 will be in the position as shown in Fig. 2. However, upon reaching the predetermined speed at which the governor 16 is set, the governor will take over the control of the valve 12 even though the lever 54 has been moved to open the valve 12.

The governor mechanism 16 may include provisions for strengthening or weakening the spring 128 so as to change the speed at which the governor will operate. The suction actuated device 10 uses only approximately one-quarter of the amount of vacuum available in the engine manifold so that if the efficiency of the engine decreases, the governor will still maintain the correct engine governing speed.

While I have illustrated and described a preferred embodiment of my invention, it is understood that this is capable of modification and I therefore do not wish to be limited to the precise details set forth but desire to avail myself of such changes and alterations as fall within the purview of the following claims.

I claim:

An engine actuated suction device including a diaphragm one side of which is exposed to atmosphere, a hollow valve member reciprocally arranged relative to said diaphragm and having a fluid port at one end of said valve member and said valve member being adapted to have its interior connected with a source of suction, an annular valve member through which said hollow valve member extends, said annular valve member being carried by said diaphragm and movable therewith relative to said hollow valve member, said annular and hollow valve members in one relative position thereof affording an atmospheric communication from said one side to the other side of said diaphragm, said hollow valve member upon movement in one direction relative to said annular valve member being operable so as to shut off the atmospheric communication to the other side of said diaphragm and to port said suction device on said other side of said diaphragm to suction through said port in said valve member, whereupon said diaphragm will be urged to move in the direction of movement of said hollow valve member, and spring means acting on said diaphragm so as to resist said movement thereof in the direction of said movement of said hollow valve member and so as to move said diaphragm in the return direction when said hollow valve member is returned to said one position to reestablish said communication from one side to the other of said diaphragm.

2. In a governing device for controlling the throttle of an internal combustion engine, a suction device including a controlling member adapted for connection with said throttle and an apertured diaphragm exposed on one side to atmosphere and connected to said controlling member and operable upon energization of said device for moving said controlling member in one direction toward its governing position, speed responsive means operable for controlling the energization of said suction device, a valve member within said suction device having a positive two-way connection with said speed responsive device so that upon movement of said valve member in said one direction relative to said diaphragm suction will be admitted to said suction device on the other side of said diaphragm and said valve member will cooperate with said diaphragm to close the aperture therein thereby to energize said suction device, said valve member being movable in the opposite direction relative to said diaphragm to open the aperture therein so as to deenergize said suction device and upon continued joint movement of said diaphragm and valve member in the same direction to shut off the suction to said other side of the diaphragm, said valve member being free for movement within limits by said speed responsive device without opposition relative to said diaphragm, the position of said valve member determining the position of said diaphragm.

3. A power unit having a chamber and a diaphragm extending across said chamber, the side of said diaphragm opposite said chamber being exposed to atmosphere, said diaphragm being movable in response to differences in pressure on opposite sides thereof and having means connected thereto and movable therewith for doing work, an annular valve member carried by and movable with said diaphragm, a wall of said chamber being provided with a valve opening, a suction chamber in communication with said valve opening, a reciprocable hollow valve member extending through and slidably arranged relative to said annular valve member and said valve opening, said hollow valve member being provided with a passage means operable in one position of said hollow valve member relative to said annular valve member for connecting said first-mentioned chamber and the space on the side of said diaphragm exposed to atmosphere in fluid flow relationship, movement of said hollow valve member out of said one position shutting off said fluid flow relationship, said hollow valve member having spaced ports therein communicating with each other through the interior of said hollow valve member, means for shifting said hollow valve member in one direction relative to said annular valve member and wall so as to expose one of said ports to said suction chamber and the other of said ports within said first-mentioned chamber thereby porting said first-mentioned chamber to suction through said ports and the interior of said hollow valve member so as to establish a lower pressure on one side of said diaphragm than on the other, thereby urging said diaphragm to follow the movement of said hollow valve member in said one direction, said hollow valve member upon being return shifted in the opposite direction positioning said ports relative to said annular valve member and wall so as to equalize the pressures on the opposite sides of said diaphragm and permit said diaphragm to be moved in said opposite direction.

4. In a governing device for controlling the throttle of an engine for governing the speed thereof, a suction device including a diaphragm one side of which is exposed to atmosphere, said diaphragm being adapted for connection to said throttle so that energization of said suction device will move said throttle toward its closed position, a hollow valve member reciprocally arranged relative to said diaphragm and having a fluid port at one end of said valve member and a suction connection at the other end, an annular valve member through which said hollow valve member extends, said annular valve member being carried by said diaphragm and movable therewith relative to said hollow valve member, said annular and hollow valve members in one relative position thereof affording an atmospheric communication from one side to the other side of said diaphragm, said hollow valve member being movable in one direction relative to said annular valve member so as to shut off the atmospheric communication from one side to the other of said diaphragm and to establish communication through said port between said suction device on said other side of said diaphragm and a source of suction, and speed responsive means connected to said hollow valve member and operable above a predetermined speed thereof to move said hollow valve member relative to said annular valve member in said one direction thereby to energize said suction device, whereupon said diaphragm will move in said one direction to move said throttle toward its closed position, said hollow valve member upon return movement to said one position relative to said annular valve member being operable to deenergize said unit.

5. A governing device according to claim 4 including means operable for biasing said diaphragm toward the open position of said throttle and wherein said suction device is constructed and arranged so as to be capable of exerting a force tending to close said throttle materially greater than the force exerted by said means on said throttle tending to open the same whereby movement of said throttle toward its closed position by said diaphragm is not materially influenced by said biasing means or by normal friction and torque reactions affecting movement of said throttle by said diaphragm.

6. In a governing device for controlling the throttle of an engine for governing the speed thereof, a suction device including a diaphragm, said diaphragm being adapted for connection with said throttle so as to be operable upon energization of said suction device for moving said throttle toward a position to govern said throttle, means operable for moving said diaphragm toward the open position of said throttle, a hollow valve member movably arranged relative to said diaphragm and having a fluid port at one end of said valve member and a suction connection communicating with said port, an annular valve member carried by said diaphragm member and movable therewith relative to said hollow valve member, movement of said hollow valve member in one direction relative to said annular valve member functioning to establish communication through said port between said suction device on one side of said diaphragm and a source of suction, speed responsive means having a two-way connection with said hollow valve member and operable when said speed responsive means attains a predetermined speed to move said hollow valve member relative to said annular valve member in said one direction so as to expose the suction device on said one side of said diaphragm to suction thereby to energize said suction device, whereupon said diaphragm will move in said one direction so as to move said throttle toward its closed position, and means including said annular valve member providing an atmospheric communication from one side to the other side of said diaphragm, said hollow valve member being constructed so that upon return movement thereof in its other direction relative to said annular valve member it will shut off the suction connection to said suction device on said one side of said diaphragm and will bleed air into said suction device on said one side of said diaphragm from the other side thereof thereby to deenergize said unit.

7. A power unit having a chamber and a diaphragm extending across said chamber, said diaphragm being movable in response to differences in pressure on opposite sides thereof and having means connected thereto and movable therewith for doing work, an annular valve member carried by and movable with said diaphragm, a wall of said chamber being provided with a valve opening, a suction chamber in communication with said valve opening, a reciprocable hollow valve member extending through and slidably arranged relative to said annular valve member and said valve opening, said hollow valve member having spaced ports therein communicating with each other through the interior of said hollow valve member, said hollow valve member in one position relative to said annular valve member being disposed so as to connect said first-mentioned chamber and the space on the side of the diaphragm remote therefrom in fluid flow relationship, said hollow valve member being shiftable in one direction out of said one position and relative to said annular valve member and wall so as to shut off said fluid flow relationship and to expose one of said ports to said suction chamber and the other of said ports within said first-mentioned chamber thereby porting said first-mentioned chamber to suction through said ports and the interior of said hollow valve member so as to urge said diaphragm to follow the movement of said hollow valve member in said one direction, said hollow valve member upon being shifted in the opposite direction toward said one position, positioning said ports relative to said wall and annular valve member so as to stop the porting of suction to said chamber and so as to reestablish said fluid flow relationship, thereby permitting said diaphragm to be moved in said opposite direction, and means connected to said hollow valve member for shifting the same in said one direction.

8. A power unit according to claim 7 including spring means acting on said diaphragm so as to resist said following movement thereof in response to said movement of said hollow valve member in said one direction and so as to move said diaphragm in said opposite direction when said hollow valve member is moved in said opposite direction to reestablish said fluid flow relationship.

9. A power unit according to claim 7 including spring means acting on said diaphragm so as to resist said following movement thereof in response to said movement of said hollow valve member in said one direction and so as to move said diaphragm in said opposite direction when said hollow valve member is moved in said opposite direction to reestablish said fluid flow relationship, and wherein said shifting means includes a speed responsive device.

10. A power unit having a chamber and a diaphragm extending across said chamber, a spring biasing said diaphragm in one direction, said diaphragm being movable in response to differences in pressure on opposite sides thereof and having means connected thereto and movable therewith for doing work, an annular valve member carried by and movable with said diaphragm, a reciprocable hollow valve member extending through and slidably arranged relative to said annular valve member and having a fluid port therein adapted to be connected through the interior of said hollow valve member with a source of suction, said hollow valve member in one position relative to said annular valve member being constructed and arranged so as to connect said chamber and the space on the side of the diaphragm remote therefrom in fluid flow relationship, said hollow valve member being shiftable in one direction out of said one position and relative to said annular valve member so as to shut off said fluid flow relationship and to expose the interior of said hollow valve member to a source of suction thereby porting said chamber to suction through said port and the interior of said hollow valve member so as to urge said diaphragm to follow the movement of said hollow valve member in said one direction, said hollow valve member upon being return shifted in the opposite direction discontinuing the porting of suction to said chamber and reestablishing said fluid flow relationship, thereby permitting said diaphragm to move in said opposite direction under the influence of said spring, and a speed responsive device connected to said hollow valve member and operable for shifting the same relative to said annular valve member.

ROBLEY D. FAGEOL.

References Cited in the file of this patent

UNITED STATES PATENTS

| Number | Name | Date |
|---|---|---|
| Re. 23,010 | Howard | June 29, 1948 |
| 1,833,908 | Maybach | Dec. 1, 1931 |
| 1,878,944 | Lombard | Sept. 20, 1932 |
| 2,142,403 | McCullough | Jan. 3, 1939 |
| 2,157,472 | Bellis | May 9, 1939 |
| 2,193,898 | Carter et al. | Mar. 19, 1940 |
| 2,212,955 | Price et al. | Aug. 27, 1940 |
| 2,450,199 | Leibing | Sept. 28, 1948 |
| 2,468,667 | Holbrook | Apr. 26, 1949 |

FOREIGN PATENTS

| Number | Country | Date |
|---|---|---|
| 252,380 | Great Britain | of 1927 |